(12) United States Patent
Okamoto

(10) Patent No.: US 8,676,359 B2
(45) Date of Patent: Mar. 18, 2014

(54) FIELD DEVICE MANAGEMENT APPARATUS AND COMPUTER PROGRAM

(75) Inventor: Hiromi Okamoto, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 441 days.

(21) Appl. No.: 13/069,871

(22) Filed: Mar. 23, 2011

(65) Prior Publication Data

US 2011/0238190 A1 Sep. 29, 2011

(30) Foreign Application Priority Data

Mar. 25, 2010 (JP) .................................. 2010-069904

(51) Int. Cl.
G05B 19/42 (2006.01)
G05B 19/18 (2006.01)
G05B 11/01 (2006.01)

(52) U.S. Cl.
USPC ......... 700/86; 700/9; 700/18; 700/19; 700/87

(58) Field of Classification Search
USPC ................ 700/9, 17–20, 83, 86–87
See application file for complete search history.

(56) References Cited

U.S. PATENT DOCUMENTS

| | | | | |
|---|---|---|---|---|
| 6,647,301 B1 * | 11/2003 | Sederlund et al. | ............... | 700/79 |
| 7,177,961 B2 * | 2/2007 | Brice et al. | ...................... | 710/36 |
| 7,676,294 B2 * | 3/2010 | Baier et al. | .................... | 700/108 |
| 7,711,989 B2 * | 5/2010 | Wang et al. | ...................... | 714/36 |
| 7,876,465 B2 * | 1/2011 | Matsueda | .................... | 358/1.15 |
| 2005/0028133 A1 * | 2/2005 | Ananth et al. | ................ | 717/105 |
| 2007/0133047 A1 * | 6/2007 | Matsueda | .................... | 358/1.15 |
| 2009/0088883 A1 * | 4/2009 | Baier et al. | .................... | 700/110 |

FOREIGN PATENT DOCUMENTS

JP 2002-268730 A 9/2002
JP 2005-158026 A 6/2005

OTHER PUBLICATIONS

Japanese Office Action dated Feb. 3, 2012, issued in corresponding application No. 2010-069904, with English Translation.

* cited by examiner

Primary Examiner — Ramesh Patel
(74) Attorney, Agent, or Firm — Westerman, Hattori, Daniels & Adrian, LLP

(57) ABSTRACT

A field device management apparatus that includes a device communication unit that provides a connection with a field device; an operation accepting unit that accepts an operation for the field device; an automatic-operation-program generating unit that generates an automatic operation program which is recorded information representing the accepted operation; a storage unit that stores the generated automatic operation program; and an automatic-operation-program executing unit that executes the automatic operation program stored in the storage unit.

4 Claims, 6 Drawing Sheets

| OPERATION INFORMATION | OPERATION PROGRAM |
|---|---|
| Set Tag, TagName=W | ProgramA |
| Set Address, Address=X | ProgramB |
| Set Parameter, ParamName=Y, Value=Z | ProgramC |
| ⋮ | ⋮ |

PRIOR ART

FIELD DEVICE MANAGEMENT APPARATUS AND COMPUTER PROGRAM

BACKGROUND OF THE INVENTION

1. Field of the Invention

The present disclosure relates to field device management apparatuses, and more specifically, to a field device management apparatus that places less of a burden on a worker who performs the same work for multiple field devices.

2. Description of the Related Art

Recently, operations of plants have been controlled on the basis of various data collected by elements generically called field devices. The field devices are provided in various sections of the plants, and include measuring devices, such as temperature sensors and flow-rate sensors, and measuring instruments for adjustment devices, such as valve opening-closing devices and flame regulation devices.

Field device management apparatuses are known as tools for performing, for example, maintenance of the field devices. The field device management apparatuses are configured as, for example, a personal computer (PC) that executes device adjusting/setting application software.

The field device management apparatuses are used to perform initialization for installing the field devices in a plant, maintenance while the plant is in operation, and replacement of the devices. The field device management apparatuses support industry standard protocols, such as BRAIN (trade name), FOUNDATION field bus (trade name), and HART (trade name), and are capable of unifying the management of field devices based on different types of protocols.

For example, when a field device installed in a plant is to be replaced, as illustrated in FIG. 6, a worker connects a field device management apparatus 300 to a field device 200 that is to be replaced. Accordingly, a device communication unit 310 included in the field device management apparatus 300 starts to communicate with the field device 200 to which the field device management apparatus 300 is connected, transmits a request for device information to the field device 200, and obtains the device information. The obtained device information of the field device 200 is displayed on a device information display unit 320.

When the worker selects the device information displayed on the device information display unit 320 and activates a device setting/adjusting function of the device setting-adjusting unit 330, device parameters are displayed on a graphical user interface (GUI) component called a device type manager (DTM) provided for each type of field device. Then, the worker can set initial parameters.

A device information management unit 340 included in the field device management apparatus 300 is capable of writing and reading information, such as device parameters, regarding the maintenance of the field devices 200 to and from a database 350. This function is used to store the settings of the field device 200 to be replaced in the database 350 and write the settings to a new field device 200. Thus, the field devices 200 can be exchanged.

As described above, the field device management apparatus 300 according to the related art has a function of communicating with the field devices 200, a function of allowing parameters of the field devices 200 to be set and adjusted by using the DTM, and a function of managing the device parameters and the information regarding the maintenance.

Japanese Unexamined Patent Application Publication No. 2005-158026 is an example of the related art.

In plants, multiple field devices 200 of the same type are sometimes installed or replaced at the same time. In such a case, the worker is required to perform the above-described operation for each of the field devices 200 and repeat the operation the same number of times as the number of field devices 200. This takes a long time.

In addition, with the recent development of intelligent field devices 200, information processing functionality with which parameter information can be set and referred to has been increased. Accordingly, the number of pieces of parameter information set for each field device 200 and the number of types thereof have increased. Therefore, a large number of various types of device parameters are displayed on the DTM screen.

As a result, when the worker tries to set or refer to a parameter of a certain field device 200, it takes a long time for the worker to find the desired parameter from among the parameters displayed on the DTM screen. This may reduce the work efficiency.

SUMMARY OF THE INVENTION

Accordingly, an object of the present disclosure is to provide a field device management apparatus that places less of a burden on a worker who performs the same work for multiple field devices.

To achieve the above-described object, a field device management apparatus according to the present disclosure includes a device communication unit that provides a connection with a field device; an operation accepting unit that accepts an operation for the field device; an automatic-operation-program generating unit that generates an automatic operation program which is recorded information representing the accepted operation; a storage unit that stores the generated automatic operation program; and an automatic-operation-program executing unit that executes the automatic operation program stored in the storage unit.

The automatic-operation-program generating unit may generate the automatic operation program on the basis of a recording start instruction or a recording stop instruction.

The automatic-operation-program generating unit may generate the automatic operation program by referring to a table in which an acceptable operation is associated with an operation program.

When the automatic-operation-program generating unit receives alarm information from the field device, the automatic-operation-program generating unit may generate the automatic operation program in association with the received alarm information.

In addition, to achieve the above-described object, a computer program according to the present disclosure causes an information processing apparatus to provide functions as a device communication unit that provides a connection with a field device; an operation accepting unit that accepts an operation for the field device; an automatic-operation-program generating unit that generates an automatic operation program which is recorded information representing the accepted operation; a storage unit that stores the generated automatic operation program; and an automatic-operation-program executing unit that executes the automatic operation program stored in the storage unit.

The present disclosure provides a field device management apparatus that places less of a burden on a worker who performs the same work for multiple field devices.

BRIEF DESCRIPTION OF THE DRAWINGS

FIG. 3 is an example of an operation-information/operation-program conversion table;

DESCRIPTION OF THE PREFERRED EMBODIMENTS

Figure 1:
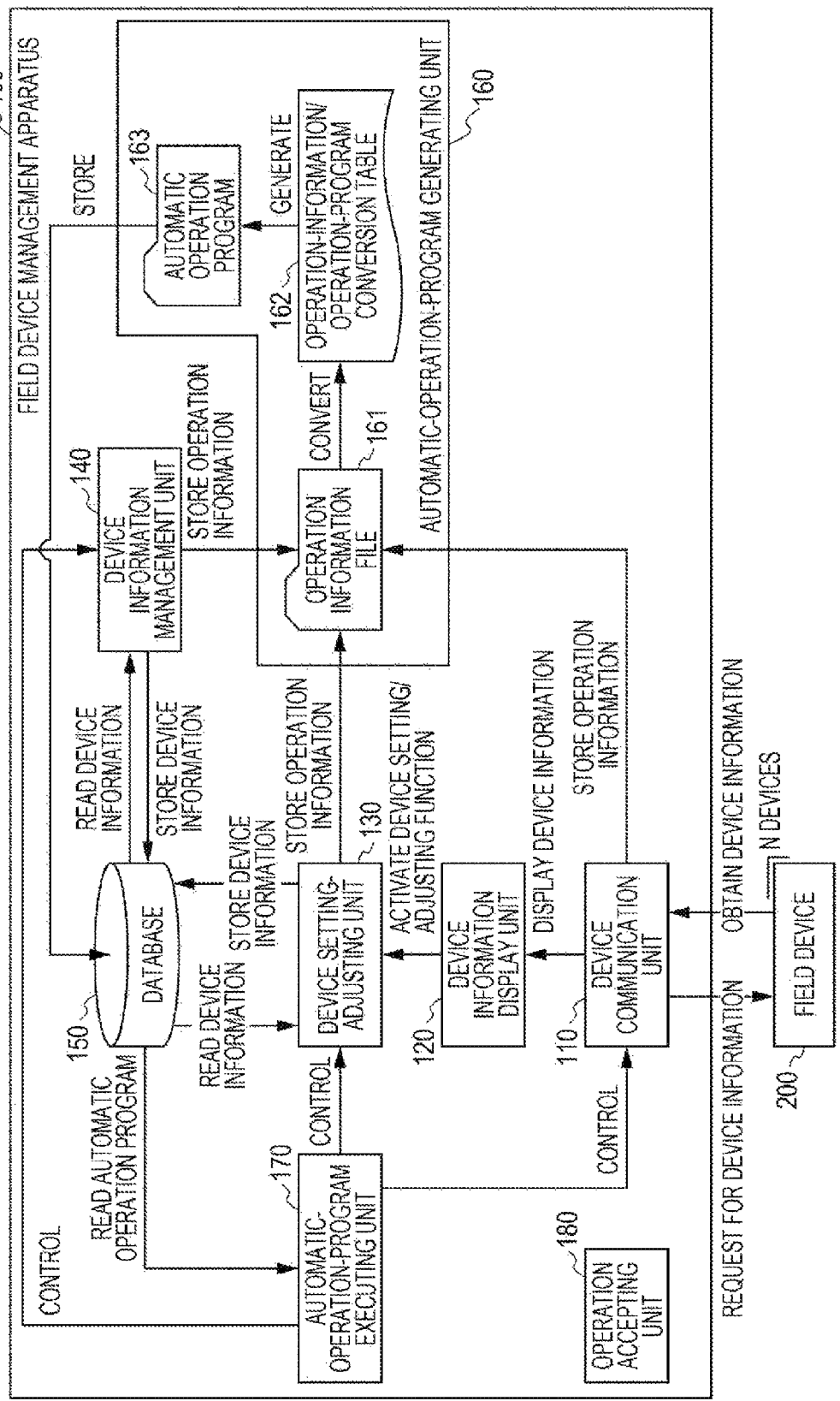
FIG. 1 is a block diagram illustrating the state in which field devices are connected to a field device management apparatus according to an embodiment.

An embodiment of the present disclosure will be described with reference to the drawings. FIG. 1 is a block diagram illustrating the state in which field devices 200 are connected to a field device management apparatus 100 according to the present embodiment.

Referring to FIG. 1, the field device management apparatus 100 includes a device communication unit 110, a device information display unit 120, a device setting-adjusting unit 130, a device information management unit 140, a database 150 that functions as a storage unit, an automatic-operation-program generating unit 160, an automatic-operation-program executing unit 170, and an operation accepting unit 180 that accepts various operations from a worker.

The field device management apparatus 100 is configured as, for example, a general purpose personal computer (PC). In this case, the PC functions as the field device management apparatus 100 by executing programs designed to carry out the functions of the above-mentioned units. The field device management apparatus 100 may, of course, instead be provided as a dedicated apparatus.

The device communication unit 110 communicates with the field devices 200 connected to the field device management apparatus 100. More specifically, for example, the device communication unit 110 transmits a request for device information to the field devices 200 and obtains the device information. The device information display unit 120 displays the obtained device information of the field devices 200.

The device setting-adjusting unit 130 has a device setting/adjusting function. When the worker selects the device information displayed on the device information display unit 120 and activates a device setting/adjusting function of the device setting-adjusting unit 130, device parameters are displayed on a graphical user interface (GUI) component called a device type manager (DTM) provided for each type of field devices. Then, the worker can set initial parameters. The device information management unit 140 is capable of writing and reading information, such as device parameters, regarding the maintenance of the field devices 200 to and from the database 150.

In addition to the above-described functions similar to those of the related art, according to the present embodiment, the device communication unit 110, the device setting-adjusting unit 130, and the device information management unit 140 have a function of writing contents of operations accepted by the operation accepting unit 180 from the worker to an operation information file 161 as operation information. In addition, the device communication unit 110, the device setting-adjusting unit 130, and the device information management unit 140 perform processes under the control of the automatic-operation-program executing unit 170.

The automatic-operation-program generating unit 160 converts the operation information written in the operation information file 161 into an automatic operation program 163 and stores the automatic operation program 163 in the database 150. The automatic-operation-program generating unit 160 refers to an operation-information/operation-program conversion table 162 to generate the automatic operation program 163 from the operation information file 161.

The automatic-operation-program executing unit 170 reads the automatic operation program 163 from the database 150 and executes the automatic operation program 163. When the automatic operation program 163 is executed, the device communication unit 110, the device setting-adjusting unit 130, and the device information management unit 140 are controlled in accordance with the automatic operation program 163.

Figure 2:
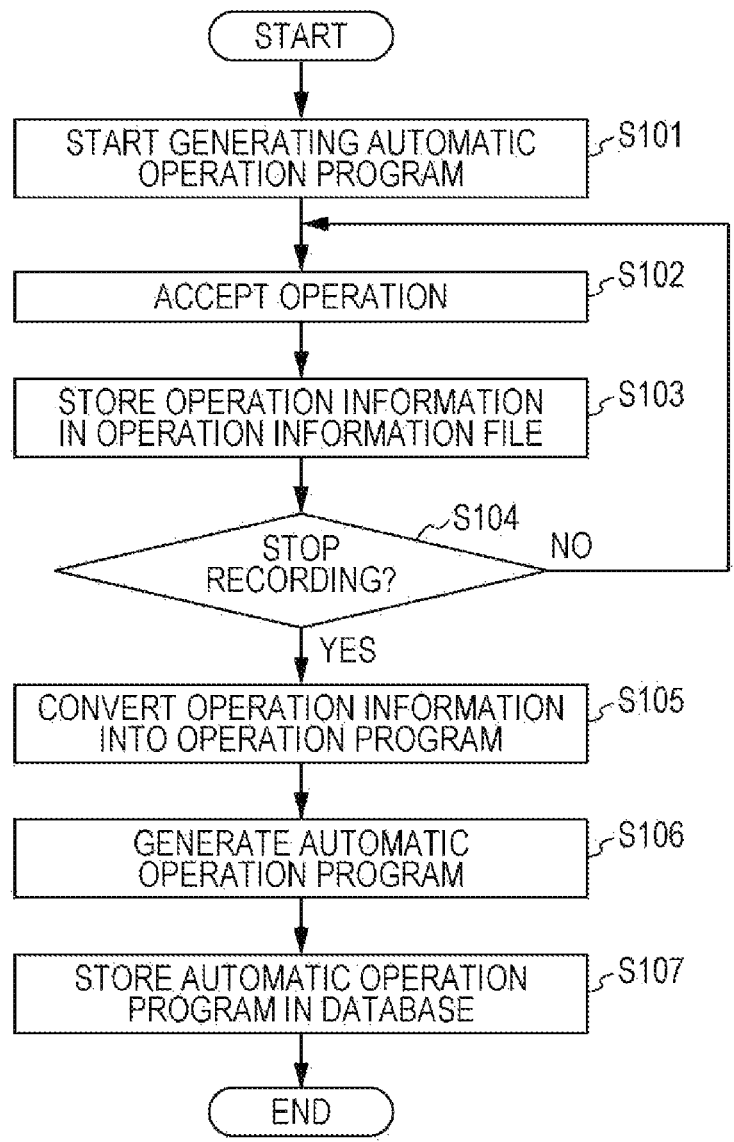
FIG. 2 is a flowchart of a process in which the field device management apparatus generates an automatic operation program and stores the automatic operation program in a database.

Processes performed by the field device management apparatus 100 having the above-described structure will now be described. First, a process in which the field device management apparatus 100 generates the automatic operation program 163 and stores the automatic operation program 163 in the database 150 will be described with reference to the flowchart of FIG. 2.

This process starts when the operation accepting unit 180 accepts an instruction to start generating the automatic operation program 163 from the worker (S101). The operation accepting unit 180 of the field device management apparatus 100 is provided with an interface, such as an operation key or a menu, for accepting the instruction to start generating the automatic operation program 163 from the worker.

After the instruction to start generating the automatic operation program 163 is accepted, every time an operation is accepted by the operation accepting unit 180 from the worker (S102), the device communication unit 110, the device setting-adjusting unit 130, and the device information management unit 140 record operation information that shows the content of the accepted operation in the operation information file 161 (S103). At this time, the worker can simply perform management operations for the desired field device 200 as in the case of the related art. While recording the operation information, the device communication unit 110, the device setting-adjusting unit 130, and the device information management unit 140 also perform management processes similar to those in the related art for the field device 200 in accordance with the operations accepted from the worker.

The device communication unit 110, the device setting-adjusting unit 130, and the device information management unit 140 record the operation information in the operation information file 161 by associating the contents of acceptable operations with commands and parameters. The commands and parameters associated with the operation contents may be written in syntax understandable by the worker, so that the operation information can be edited, changed, confirmed, etc., afterwards.

The above-described process of recording the operation information is repeated until the worker issues an instruction to stop the recording process (S104). When the worker issues the instruction to stop the recording process (Yes in S104), the automatic-operation-program generating unit 160 converts the operation information recorded in the operation information file 161 into operation programs (S105).

FIG. 3 illustrates an example of the operation-information/operation-program conversion table 162 that is referred to by the automatic-operation-program generating unit 160 in the process of generating the operation programs on the basis of the operation information file 161.

As illustrated in FIG. 3, in the operation-information/operation-program conversion table 162, each piece of the operation information is associated with an operation program. The operation programs may be written in a format that is not understandable by the worker as long as the format can be interpreted by the automatic-operation-program executing unit 170.

The pieces of the operation information recorded in the operation information file 161 are individually converted into the operation programs. When the pieces of the operation information recorded in the operation information file 161 are all converted into the operation programs, the operation programs are combined together as a single automatic operation program 163 (S106).

The generated automatic operation program 163 is stored in the database 150 (S107). At this time, the worker may be prompted to assign an arbitrary file name to the automatic operation program 163. For example, a name that corresponds to the operation contents may be assigned to improve the convenience in calling up the automatic operation program 163 afterwards.

Figure 4:
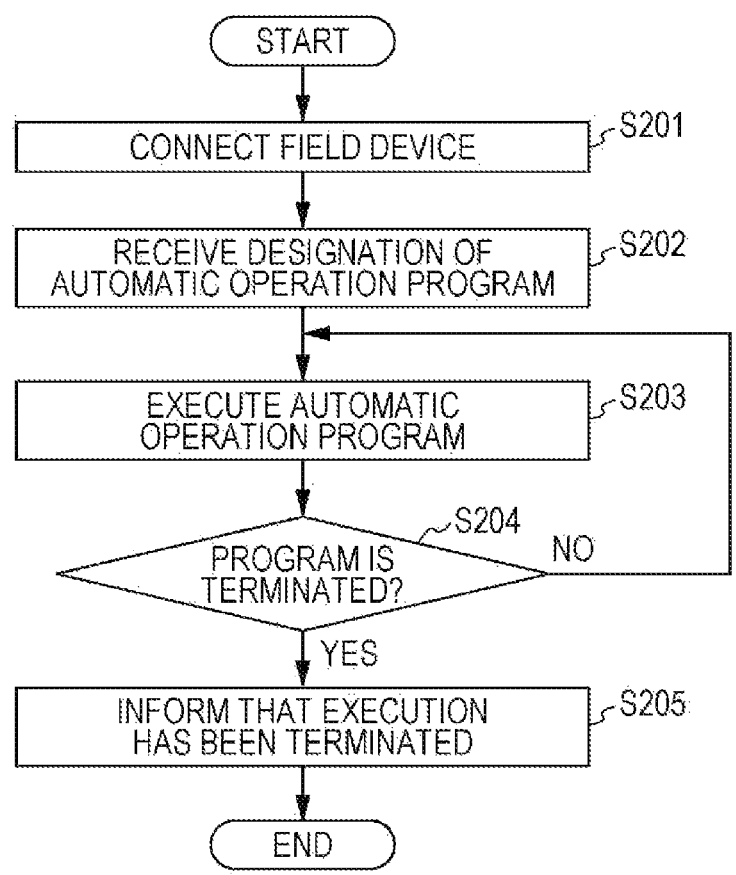
FIG. 4 is a flowchart of a process in which the field device management apparatus executes the automatic operation program.

Next, a process in which the field device management apparatus 100 executes the automatic operation program 163 will be described with reference to the flowchart of FIG. 4. The automatic operation program 163 is executed when a sequence of operations performed for a certain field device 200 while recording the automatic operation program 163 is to be performed for another field device 200.

First, the worker connects the field device management apparatus 100 to the field device 200 for which the operations are to be performed (S201). Then, the field device management apparatus 100 receives an instruction that specifies the automatic operation program 163 to be executed for the connected field device 200 from the automatic operation programs 163 stored in the database 150 (S202).

When the instruction that specifies the automatic operation program 163 to be executed is received, the automatic-operation-program executing unit 170 reads the automatic operation program 163 and controls the device communication unit 110, the device setting-adjusting unit 130, and the device information management unit 140 in accordance with the automatic operation program 163. Thus, management processes for the field device 200 are sequentially performed (S204).

The above-described process is repeated until the automatic operation program 163 is terminated (S204). When the automatic operation program 163 is terminated (Yes in S204), the worker is informed that the automatic operation program 163 has been terminated (S205), and the process is ended.

Thus, the field device management apparatus 100 automatically performs the management processes for the field device 200 in accordance with the automatic operation program 163. Therefore, the burden placed on the worker who performs the same work for multiple field devices can be greatly reduced.

As described above, according to the field device management apparatus 100 of the present embodiment, when the same work is performed for multiple field devices 200, the work performed for the first field device 200 is recorded as the automatic operation program 163. Then, the automatic operation program 163 is executed for the second and the following field devices 200, so that the work is automated.

Therefore, when, for example, the worker performs an operation of replacing the field devices 200, it is not necessary for the worker to write down setting parameters or remembering the operation procedure. As a result, the work load is reduced. In addition, the work time is greatly reduced.

Further, the automatic operation program 163 may be generated for each operation that is frequently performed in the management of the field devices 200 having a large number of various types of device parameters, and be stored in the database 150 in advance. In such a case, the automatic operation programs 163 may be performed as necessary, and the work efficiency can be greatly increased.

Figure 5:
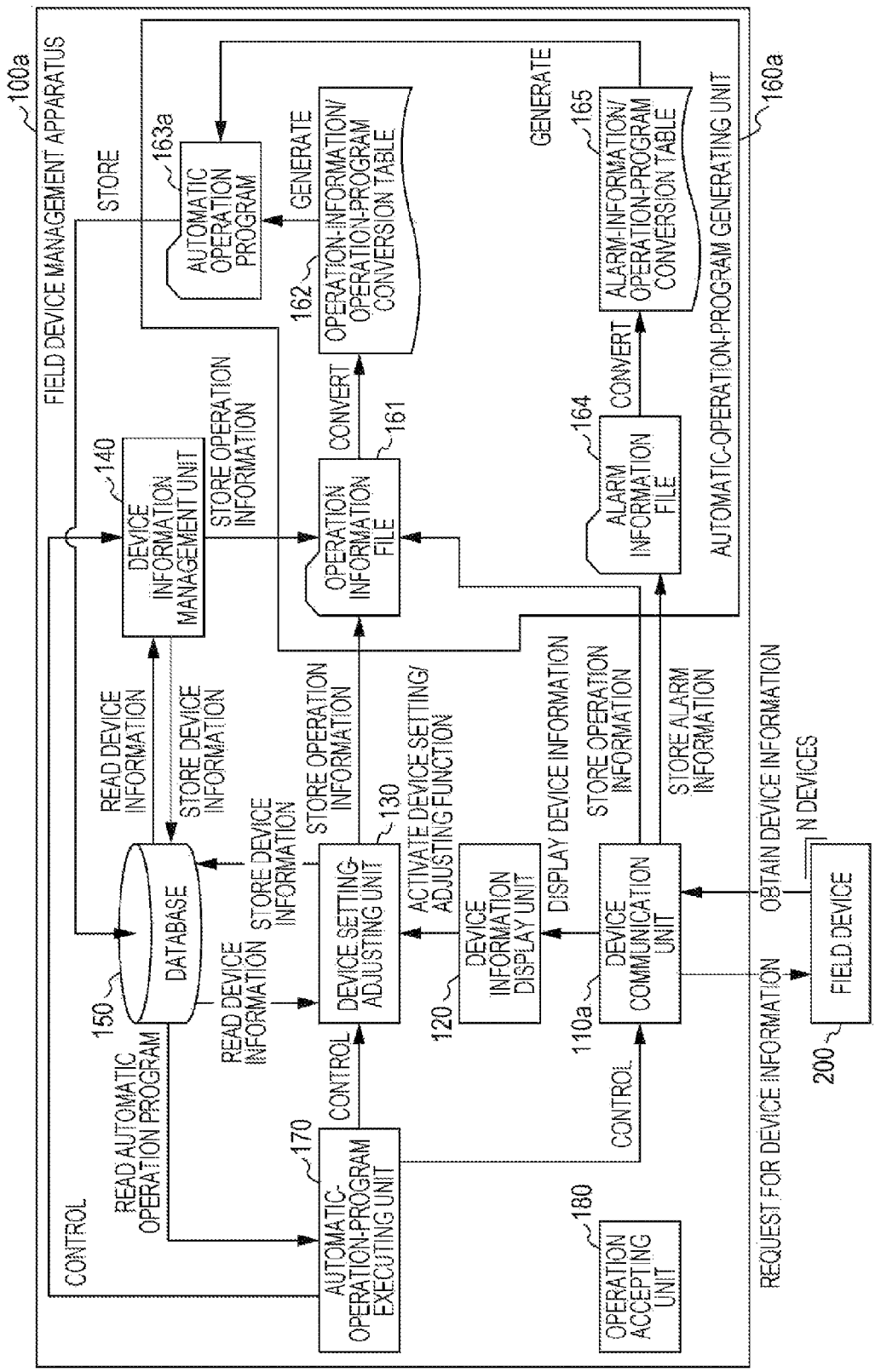
FIG. 5 is a block diagram illustrating a modification of the embodiment.
Figure 6:
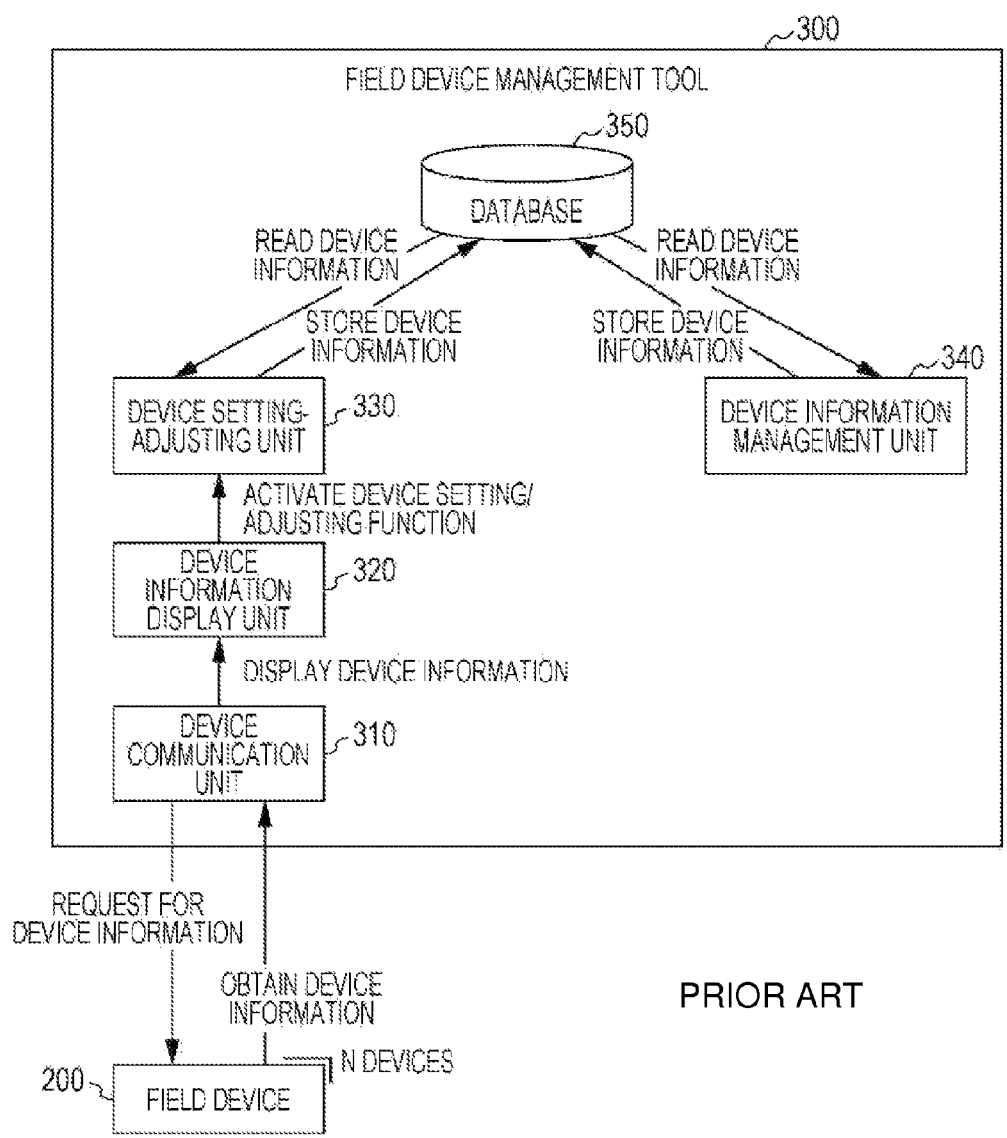
FIG. 6 is a block diagram illustrating the state in which field devices are connected to a field device management apparatus according to the related art.

Next, a modification of the present embodiment will be described. FIG. 5 is a block diagram illustrating a field device management apparatus 100a according to a modification of the present embodiment. In the following description, functional units similar to those in the above-described embodiment are denoted by the same reference numerals.

In the above-described embodiment, the information regarding the operations of the field device management apparatus 100 is recorded as the operation information file 161. The automatic operation program 163 is generated based on this.

In the modification, automatic operation programs are generated on the basis of information of errors transmitted from the field devices 200 and the operations performed by the field device management apparatus 100a when the errors occur.

In this case, as illustrated in FIG. 5, an automatic-operation-program generating unit 160a is provided with an alarm information file 164 and an alarm-information/operation-program conversion table 165.

In this modification, when a device communication unit 110a receives alarm information indicating that an error has occurred from the field device 200 that is connected to the device communication unit 110a, the device communication unit 110a records the received alarm information in the alarm information file 164. In addition, similar to the above-described embodiment, the device communication unit 110a, the device setting-adjusting unit 130, and the device information management unit 140 records the operations performed by the worker in response to the alarm in the operation information file 161.

Then, the automatic-operation-program generating unit 160a converts the operation information recorded in the operation information file 161 into operation programs by referring to the operation-information/operation-program conversion table 162. In addition, the automatic-operation-program generating unit 160a converts the alarm information recorded in the alarm information file 164 into the format of the operation programs by referring to the alarm-information/operation-program conversion table 165. Then, an automatic operation program 163a is generated by associating the operation programs with the alarm information converted into the format of the operation programs, and is stored in the database 150.

If the error occurs again in the field device 200 and the alarm information is transmitted therefrom, the automatic-operation-program executing unit 170 reads the automatic operation program 163a associated with the alarm information from the database 150 and executes the automatic operation program 163a. Accordingly, the field device management apparatus 100a can perform an automatic maintenance operation in response to the error. The execution of the automatic operation program 163a may be started in response to an instruction from the worker.

Although a field device management apparatus has been described as an example in the above-described embodiment, the present disclosure may instead be applied to a plant control system so that the entire plant can be automatically managed. The present disclosure may also be applied to full-stroke tests and partial-stroke tests of valves which require periodic inspections.

What is claimed is:

1. A field device management apparatus comprising:
    a device communication unit that provides a connection with a field device;
    an operation accepting unit that accepts an operation for the field device entered by a plant worker;
    an automatic-operation-program generating unit that generates an automatic operation program which is recorded information representing the accepted operation from the plant worker on the basis of a recording start instruction or a recording stop instruction;
    a storage unit that stores the generated automatic operation program; and
    an automatic-operation-program executing unit that executes the automatic operation program stored in the storage unit,
    wherein, when the automatic-operation-program generating unit receives alarm information from the field device, the automatic-operation-program generating unit generates the automatic operation program by associating the automatic operation program with the received alarm information.

2. The field device management apparatus according to claim 1, wherein, when the alarm information is transmitted again, the automatic-operation-program executing unit reads out and executes the automatic operation program previously associated with the alarm information.

3. The field device management apparatus according to claim 1, wherein the automatic-operation-program generating unit generates the automatic operation program by referring to a table in which an acceptable operation is associated with an operation program.

4. A computer program causing an information processing apparatus to implement:
    a device communication unit that provides a connection with a field device;
    an operation accepting unit that accepts an operation for the field device entered by a plant worker;
    an automatic-operation-program generating unit that generates an automatic operation program which is recorded information representing the accepted operation from the plant worker on the basis of a recording start instruction or a recording stop instruction;
    a storage unit that stores the generated automatic operation program; and
    an automatic-operation-program executing unit that executes the automatic operation program stored in the storage unit,
    wherein, when the automatic-operation-program generating unit receives alarm information from the field device, the automatic-operation-program generating unit generates the automatic operation program by associating the automatic operation program with the received alarm information.

* * * * *